July 15, 1958     J. M. BEAUFORT     2,843,431
HYDRAULIC TRACK TENSIONING DEVICE
Filed Dec. 28, 1956                           2 Sheets-Sheet 1
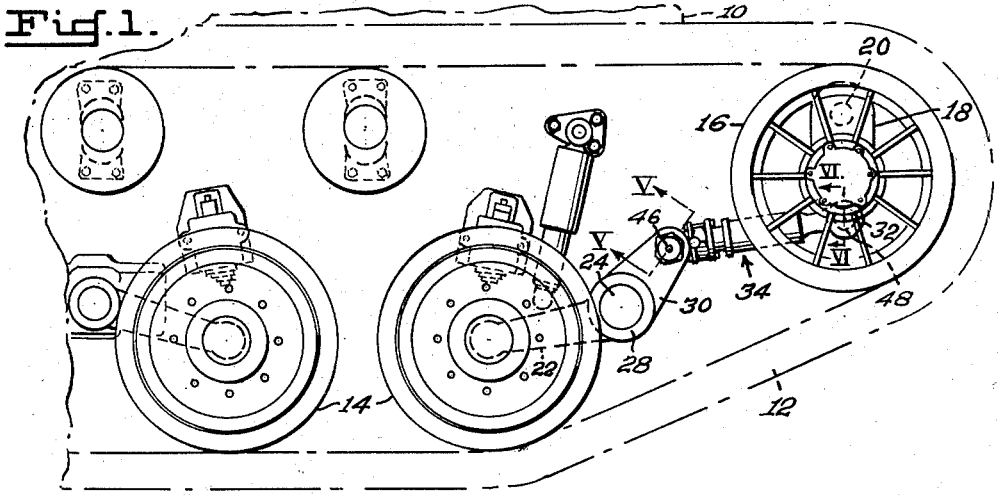
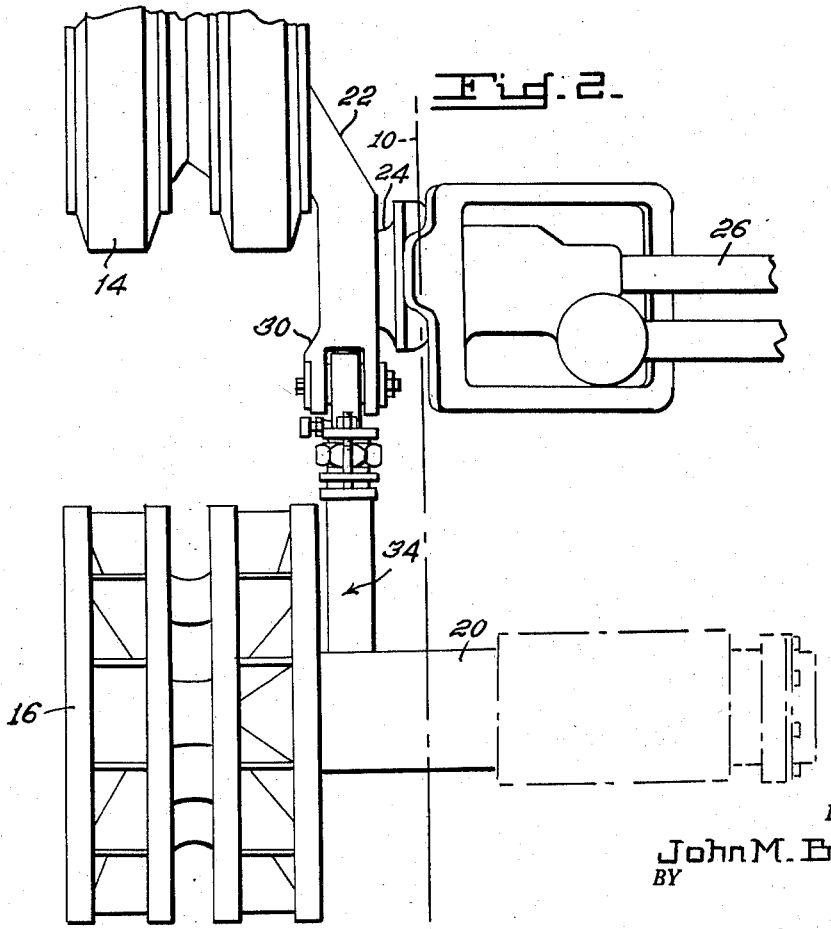
INVENTOR.
John M. Beaufort

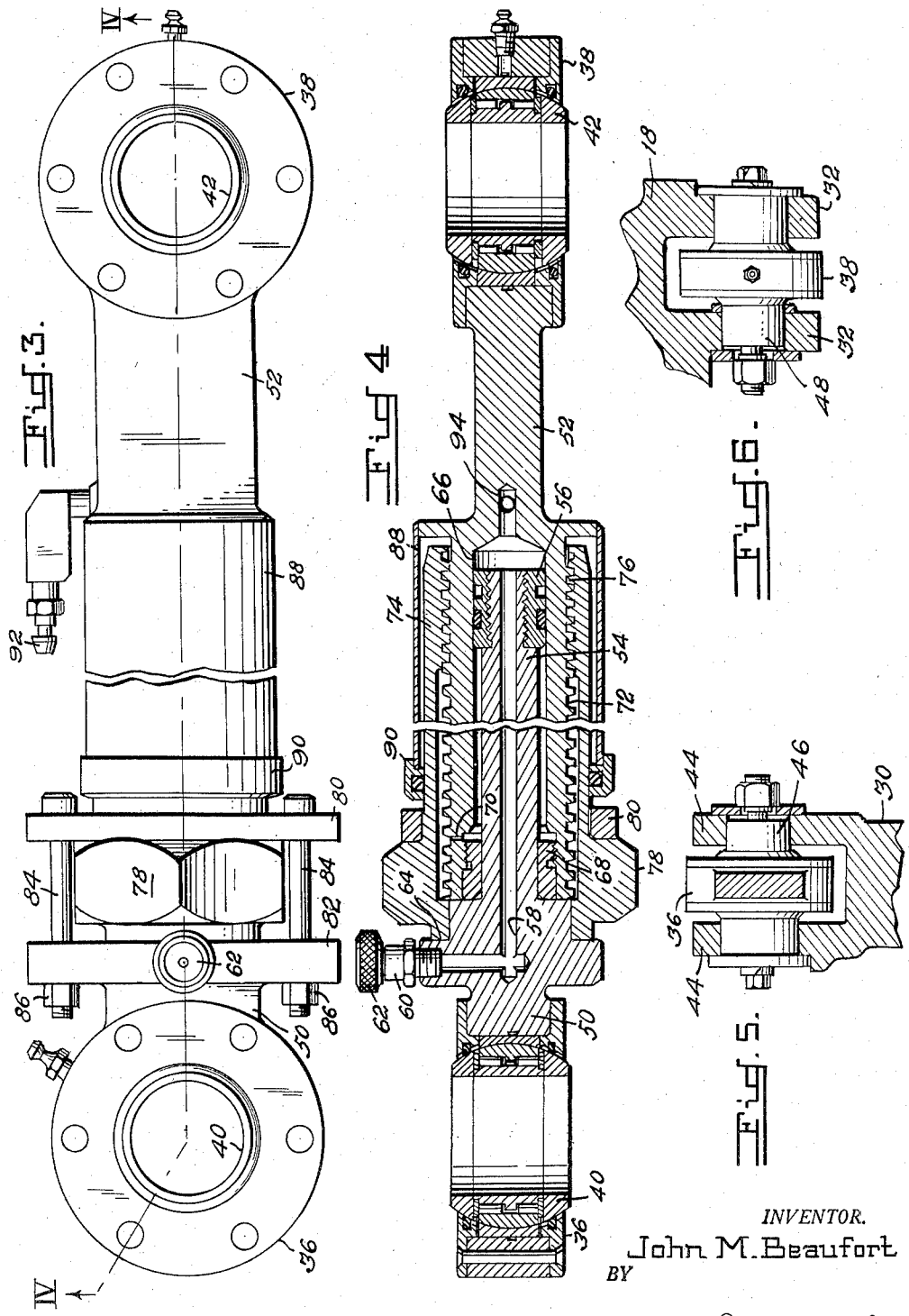

United States Patent Office 2,843,431
Patented July 15, 1958

2,843,431

HYDRAULIC TRACK TENSIONING DEVICE

John M. Beaufort, Mercer Island, Wash., assignor to the United States of America as represented by the Secretary of the Army Application December 28, 1956, Serial No. 631,384

7 Claims. (Cl. 305—9)

The invention relates to track tensioning devices such as are found on track laying vehicles.

Track laying vehicles are usually very heavy and consequently the stress transmitted to the track during operation is considerable. As large fluctuating forces subject the track to extreme pressures, it is imperative that the track be under the proper tension to prevent "throwing" the track from the road and idler wheels during turns and high speeds.

During operation of the vehicle, the track tension will change due to wear in the connecting pins interlocking the track shoes, and periodically the track should be retensioned to maintain optimum performance.

It is thus an object of the invention to design an improved track tensioning device which is capable of rapidly adjusting and holding the tension of the track of a vehicle.

Another object of the invention is to produce a hydraulic track tensioning device which may be locked in adjusted position and will indicate directly the amount of tension exerted on the track.

Yet another object of the invention is to design a hydraulic track tensioning device which may be operated, in cases of emergency, independent of hydraulic means.

These and other objects of the invention will become apparent from the following specification and included drawings wherein:

Fig. 1 is an elevational view of the invention as utilized on a vehicle.

Fig. 2 is a plan view of the invention in situ.

Fig. 3 is a plan view of the hydraulic cylinder assembly.

Fig. 4 is a cross-section elevational view of the hydraulic cylinder assembly taken along the line IV—IV of Fig. 3.

Fig. 5 is a sectional view of a connecting pin taken along the line V—V of Fig. 1.

Fig. 6 is a sectional view of another connecting pin taken along the line VI—VI of Fig. 1.

In conventional construction, the tension in the track of vehicles is adjusted by moving the idler wheel forward or backward, and it is with this type of tension adjusting system the invention is utilized.

As viewed in Fig. 1, the vehicle 10 is supported on a track 12, which in turn is guided by a series of bogey or road wheels 14 and an idler wheel 16. These wheels are indirectly supported in the frame of the vehicle wherein the idler wheel 16 is rotatably connected to an arm 18 which is pivotally attached to the vehicle 10 by a shaft 20.

The bogey or road wheels 14 are connected to the vehicle by means of a suspension system which includes an arm 22 to which the wheel is rotatably mounted. The arm 22 is keyed to a shaft 24 rotatably supported in the vehicle frame. The shaft 24 is fixed to a torsion bar 26 which thereby provides the suspension of road wheel 14. Thus, as the road wheels are deflected upwardly by uneven terrain, the torsion bars 26 will absorb the shocks. The above structure is conventional with track type vehicles and is not considered to require detailed explanation.

The arm 22 is fixed to shaft 24 through a hub 28 and as will be noticed in Fig. 1 another arm 30 extends from hub 28. The outer end of idler wheel supporting arm 18 is provided with yoke 32, Fig. 6, and it is between arm 30 and yoke 32 wherein the track tensioning cylinder assembly 34 is located.

The cylinder assembly 34 is provided with connecting end portions 36 and 38 as seen in Figs. 3 and 4. Portions 36 and 38 are used to connect the cylinder assembly 34 to the supporting arms and contain anti-friction spherical bearings 40 and 42, respectively.

As seen in Fig. 5, the arm 30 is constructed with a yoke 44 and is bored as to receive the pin 46 which may be locked in position by means of threaded fasteners. Thus, the assembly 34 may be pivotally fixed to arm 30 by inserting pin 46 through the bore in bearing 40 and may be pivotally fixed to arm 18 by inserting portion 38 within yoke 32 and using pin 48 within the bore of bearing 42.

The assembly 34 consists of a piston element 50 and a cylinder element 52 on which the end portions 36 and 38 are respectively located. The piston element 50 consists of an elongated cylindrical piston rod 54 on which a plunger 56 is threadedly attached. Plunger 56 is provided with annular grooves and sealing rings so as to insure a fluid-tight connection with the cylinder wall. A bore 58 is formed within piston 50, one end of which is open to the end of the piston rod and the other end of bore 58 terminates at nipple 60 which is provided with a cap 62, for a purpose later described. A shoulder 64 is also formed in piston 50 to act as the abutment for the locking means as will be shown hereinafter.

The cylinder element 52 is constructed with a cylinder 66 into which the piston rod 54 is inserted. The open end of cylinder 66 is lined with a guide 68 which slidingly engages the rod 54 and prevents misalignment of the piston and cylinder during operation. A vent 70 is located in the cylinder wall to permit the air trapped behind the plunger 56 to escape as the assembly is extended.

The outer surface of the cylinder element 52 is machined with a coarse thread as shown at 72 for engagement with the locking means.

The aforementioned locking means comprises a sleeve 74 which is of a tubular configuration and encompasses cylinder element 52. A portion of sleeve 74 is threaded at 76 to engage with the threads 72 of the cylinder element 50 while the remainder of the internal diameter of sleeve 74 is smooth bored. The sleeve 74 is also formed with a hexagonal wrench gripping portion 78 to facilitate rotation.

A lock ring 80 abuts portion 78 and is connected to a flange 82 which is an integral part of piston element 50, by a pair of bolts 84 and nuts 86 such that the ring 80 may be drawn up tight to lock sleeve portion 78 against the piston shoulder 64.

A cover 88 is affixed to cylinder element 52 and protects the assembly from dirt and water. An O ring seal 90 is attached to the open end of cover 88 to insure a dirt and water-proof connection.

The tension adjusting assembly 34 is actuated by a hydraulic pump, either motor driven or manual, and may introduce fluid under pressure into the cylinder 66 by means of fluid connection 92 which communicates with conduit 94.

If during the operation of the vehicle 10 the track 12 has become slackened due to wear or temperature changes, the track may be properly tensioned by the following procedure:

First, the nuts 86 are removed from the bolts 84 which will unlock the sleeve 74 and permit axial reciprocation of the same. Fluid pressure is then introduced into the cylinder 66 by means of a suitable pump. Should there be any air in the fluid system, the cylinder 66 may be bled by opening cap 62 momentarily until it is determined that all air has been removed. After cap 62 has been closed, continued flow of fluid in cylinder 66 will act upon plunger 56 and cylinder element 52 to extend the assembly 34. As the assembly is extending, the plunger 56 will be sliding within cylinder 66, the guide 68 will be approaching plunger 56, and the sleeve 74 will be moving with cylinder element 52.

It will be observed from Fig. 1 that as the bearings 40 and 42 are moving away from each other, the resultant reaction on the arm 18 will cause the arm to pivot about the shaft 20, and, as the idler wheel 16 is mounted eccentric to shaft 20, this action will cause the track 12 to be tightened.

A pressure gage, not shown, is interposed in the fluid line between the pump and cylinder assembly 34 such that the pressure within cylinder 66 may be determined at any time. It is a feature of the invention that the cross-sectional area of plunger 56 and cylinder be such that the fluid pressure in pounds per square inch is directly equal to the pounds of force exerted upon the track. Thus, the track tension may be read directly from the fluid pressure gage.

When the track is properly tensioned, the fluid pressure within cylinder 66 is maintained, and sleeve 74 is rotated by means of portion 78 until the portion 78 tightly abuts the shoulder 64. The bolts 84 are then inserted in the holes of flange 82, and nuts 86 are tightened to draw ring 80 snugly against portion 78. As will be noticed in Fig. 3, the bolts 84 will prevent portion 78 from rotating, and thus, the assembly 34 will be locked in the proper extended position to maintain the correct track tension.

Once the cylinder assembly 34 has been locked, the fluid pressure may be released, if desired, as the sleeve 34 and threads 72 and 76 maintain the adjusted assembly length.

By connecting the track adjusting cylinder assembly 34 to the arm 30, a deflection of the nearest road wheel 14 will also cause the idler wheel to move, thereby automatically compensating for tension changes due to movement of the road wheel 14.

Should the fluid pump system fail, it is possible to change the track tension manually. Manual operation may be accomplished by unlocking ring 80 as described above. A wrench may then be applied to sleeve portion 78 and rotation of sleeve 74 will move the cylinder element 52 away from piston 50 due to the function of threads 72 and 76. Once the track is tensioned, the ring 80 may be used to lock the assembly 34 in position as described above.

It is thus observed that the invention produces an efficient, convenient means for tensioning a vehicle track. The use of a related cylinder size and pressure gage permits an inexperienced operator to properly tension the track without danger of excessive stress being applied and the cooperation of the tensioning assembly with the road wheel suspension system helps to maintain a constant track tension over terrain obstacles.

It will be understood that modifications of the disclosed embodiment may be apparent to those skilled in the art without departing from the spirit and scope of the invention and it is intended that the invention be limited only by the scope of the following claims.

I claim:

1. In a track tensioning device for a tracked vehicle supported on road wheels comprising, an arm pivotally supported in the vehicle frame, an idler wheel rotatably mounted on said arm, suspension structure supporting said road wheels and a hydraulic cylinder interposed between said arm and said suspension structure whereby said arm and idler wheel may be positioned to adjust the track tension.

2. In a vehicle track supporting structure, a road wheel suspended from the vehicle frame in engagement with the track, an idler wheel rotatably mounted on a pivotally supported arm, a hydraulic cylinder interposed between the road wheel suspension structure and said idler wheel, and locking means carried by said cylinder whereby the cylinder may be held in any position of extension.

3. In a hydraulic cylinder assembly, a tubular cylinder element open at one end, a piston element inserted into the open end of said cylinder, a shoulder on said piston element, threads formed on the outer surface of said cylinder element, an internally threaded sleeve in engagement with the threads of said cylinder element and means for locking said sleeve in abutting relation to said shoulder.

4. In a hydraulic cylinder assembly as in claim 3 wherein the means for locking the sleeve comprises a lock ring in engagement with the sleeve and fastening means connecting said lock ring to the piston element.

5. In a hydraulic cylinder assembly, a tubular cylinder open at one end, threads formed on the outer wall of said cylinder, a piston extending into said cylinder, a plunger attached to said piston and engaging the inner wall of the cylinder, a shoulder formed on the piston, an internally threaded sleeve in engagement with the cylinder threads and adapted to abut the piston shoulder, a locking ring in engagement with said sleeve whereby said sleeve may be locked against rotational and axial movement, a tubular cover supported by said cylinder and surrounding said sleeve and conduit means communicating with said cylinder whereby fluid may be introduced to operate the cylinder assembly.

6. In a track mounting system for a tracked vehicle including a road wheel in rolling contact with said track, suspension means for said road wheel, an idler wheel rotatably mounted on a pivotally supported arm, a tubular cylinder connected to said arm, said cylinder formed with threads on the outer wall thereof, a piston connected to the suspension means of said road wheel and inserted in said cylinder, a plunger attached to the end of said piston, an internally threaded sleeve coacting with the threads of said cylinder, a lock ring engageable with said sleeve whereby said sleeve may be locked against rotational and axial movement and conduit means communicating with said cylinder whereby fluid may be introduced to actuate said cylinder and piston thereby positioning said idler wheel and adjusting the tension of the track.

7. In a track mounting system for a tracked vehicle including a road wheel in rolling contact with said track, suspension means for said road wheel, an idler wheel rotatably mounted on a pivotally supported arm, a tubular cylinder connected to said arm, said cylinder formed with threads on the outer wall thereof, a piston connected to said suspension means of said road wheel and inserted in said cylinder, a plunger attached to the end of said piston, an internally threaded sleeve coacting with the threads of said cylinder, a lock ring engageable with said sleeve whereby said sleeve may be locked against rotational and axial movement, and conduit means communicating with said cylinder whereby fluid may be introduced to actuate said cylinder piston and plunger thereby positioning said idler wheel and adjusting the tension of said track, said plunger having an area such that the fluid pressure in pounds per square inch is equal to the tension in the track measured in pounds.

References Cited in the file of this patent

UNITED STATES PATENTS

| 2,427,162 | Schilling et al. | Sept. 9, 1947 |
| 2,669,972 | Cross | Feb. 23, 1954 |
| 2,697,641 | Henderson | Dec. 21, 1954 |
| 2,736,294 | Buehner | Feb. 28, 1956 |

FOREIGN PATENTS

| 508,850 | Canada | Jan. 4, 1955 |